(12) United States Patent
Jonuscheit

(10) Patent No.: US 10,974,712 B2
(45) Date of Patent: Apr. 13, 2021

(54) VEHICLE AND METHOD FOR OPERATING A CLUTCH AS A STARTER ELEMENT

(71) Applicant: AUDI AG, Ingolstadt (DE)

(72) Inventor: Michael Jonuscheit, Nuremberg (DE)

(73) Assignee: AUDI AG, Ingolstadt (DE)

( * ) Notice: Subject to any disclaimer, the term of this patent is extended or adjusted under 35 U.S.C. 154(b) by 224 days.

(21) Appl. No.: 16/306,131

(22) PCT Filed: Jun. 7, 2017

(86) PCT No.: PCT/EP2017/063776
§ 371 (c)(1),
(2) Date: Nov. 30, 2018

(87) PCT Pub. No.: WO2017/211862
PCT Pub. Date: Dec. 14, 2017

(65) Prior Publication Data
US 2020/0331450 A1 Oct. 22, 2020

(30) Foreign Application Priority Data

Jun. 7, 2016 (DE) ...................... 10 2016 209 998.1

(51) Int. Cl.
*B60W 10/02* (2006.01)
*F16D 48/06* (2006.01)

(52) U.S. Cl.
CPC ............ *B60W 10/023* (2013.01); *F16D 48/06* (2013.01); *B60W 2710/027* (2013.01);
(Continued)

(58) Field of Classification Search
CPC ......... B60W 10/023; B60W 2710/027; B60W 2710/065; B60W 2710/0666; F16D 48/06;
(Continued)

(56) References Cited

U.S. PATENT DOCUMENTS

2003/0110875 A1* 6/2003 Brandt .................. B60W 30/18
74/335
2004/0064232 A1* 4/2004 Eich ........................ F16D 48/06
701/68
(Continued)

FOREIGN PATENT DOCUMENTS

CN  101981337 A  2/2011
CN  104816722 A  8/2015
(Continued)

OTHER PUBLICATIONS

International Preliminary Report on Patentability dated Dec. 20, 2018 in corresponding International Application No. PCT/EP2017/063776; 7 pages.
(Continued)

*Primary Examiner* — Tisha D Lewis
(74) *Attorney, Agent, or Firm* — Maier & Maier, PLLC

(57) ABSTRACT

A vehicle, in the drivetrain of which a clutch, in particular a wet-running multi-disc clutch, is connected as a starter element between an internal combustion engine and a transmission, having a clutch controller, which, as a function of current driving operation parameters, determines a setpoint clutch torque and actuates a clutch actuator with a manipulated variable correlating with the setpoint clutch torque, in order to set at the clutch an actual clutch torque, which manipulated variable is determined as a function of the setpoint clutch torque and of a coefficient of friction stored in the clutch controller in an actuation unit of the clutch controller, and having an engine controller, which determines an actual engine rotational speed and an actual engine torque, and, in a stationary state of the vehicle with the internal combustion engine running, regulates the actual engine rotational speed to a predefined idling rotational speed.

10 Claims, 4 Drawing Sheets

(52) U.S. Cl.
CPC ............... *B60W 2710/065* (2013.01); *B60W 2710/0666* (2013.01); *F16D 2500/30402* (2013.01); *F16D 2500/5045* (2013.01); *F16D 2500/70605* (2013.01)

(58) Field of Classification Search
CPC ... F16D 2500/30402; F16D 2500/5045; F16D 2500/70605
See application file for complete search history.

(56) References Cited

U.S. PATENT DOCUMENTS

| | | | |
|---|---|---|---|
| 2004/0157704 A1* | 8/2004 | Stork | B60W 10/08 477/166 |
| 2010/0113218 A1 | 5/2010 | Herter et al. | |
| 2011/0004380 A1 | 1/2011 | Kojima et al. | |
| 2015/0005136 A1 | 1/2015 | Schmoll Genannt Eisenwerth et al. | |
| 2015/0217759 A1 | 8/2015 | Wimmer et al. | |
| 2016/0010707 A1* | 1/2016 | Milehins | F16D 48/06 701/68 |
| 2016/0047428 A1 | 2/2016 | Neuberth et al. | |

FOREIGN PATENT DOCUMENTS

| | | |
|---|---|---|
| CN | 105980727 A | 9/2016 |
| CN | 106662176 A | 5/2017 |
| DE | 197 51 455 A1 | 5/1999 |
| DE | 198 46 404 A1 | 4/2000 |
| DE | 100 09 860 A1 | 9/2001 |
| DE | 102 01 982 A1 | 7/2002 |
| DE | 103 16 454 A1 | 10/2003 |
| DE | 10 2004 029 558 A1 | 1/2005 |
| DE | 102007015679 A1 | 10/2008 |
| DE | 10 2008 027 071 A1 | 1/2009 |
| DE | 10 2010 046 138 A1 | 3/2012 |
| DE | 10 2011 080 716 A1 | 4/2012 |
| DE | 10 2012 210 201 A1 | 1/2013 |
| DE | 102011089676 A1 | 6/2013 |
| DE | 102013201261 A1 | 8/2013 |
| DE | 102014206183 A1 | 10/2014 |
| DE | 102015011855 A1 | 4/2016 |
| JP | 2006-136173 A | 5/2006 |
| WO | 03/006841 A2 | 1/2003 |
| WO | 03/086806 A1 | 10/2003 |
| WO | 2015/048962 A2 | 4/2015 |
| WO | 2016/008463 A1 | 1/2016 |

OTHER PUBLICATIONS

Examination Report dated Mar. 6, 2017 of corresponding German application No. 10 2016 209 998.1; 15 pages.
International Search Report dated Aug. 31, 2017 in corresponding International application No. PCT/EP2017/063776; 8 pages.
Written Opinion of the International Search Authority dated Aug. 31, 2017 in corresponding International application No. PCT/EP2017/063776; 10 pages.
Examination Report dated Oct. 4, 2019, in corresponding European patent application No. 17728206.8 including partial machine-generated English language translation; 4 pages.
Office Action dated Sep. 2, 2019, in corresponding Chinese Application No. 201780035342.9 including partial machine-generated English language translation; 8 pages.
Communication pursuant to Article 94(3) EPC dated Apr. 2, 2019 in corresponding European Application No. 17 728 206.8 including partial machine-generated English language translation; 4 pages.

* cited by examiner

VEHICLE AND METHOD FOR OPERATING A CLUTCH AS A STARTER ELEMENT

FIELD

The invention relates to a vehicle and to a method for operating a clutch, in particular a wet-running multi-disc clutch, as a starter element.

BACKGROUND

In a generic motor vehicle, a clutch, in particular a wet-running multi-disc clutch, can be connected as a starter element in the drivetrain between the internal combustion engine and the transmission. Said clutch can be operated in an automated manner by means of a clutch actuator, which can be actuated electrohydraulically by a clutch controller and, namely, to the effect that the clutch can transmit a predetermined torque (that is, a clutch torque). For actuation of the clutch, a setpoint clutch torque is specified in the clutch controller and is converted in an actuation unit to a manipulated variable that correlates therewith (that is, in a hydraulic system, to a hydraulic pressure) and can be applied to the clutch actuator, so that the clutch can transmit a predetermined torque. The manipulated variable (that is, the hydraulic pressure) is determined in the actuation unit as a function of the setpoint clutch torque and a coefficient of friction, which is stored in the clutch controller and describes the amplification occurring between the hydraulic pressure acting on clutch actuator (that is, a normal force acting on the clutch) and the resulting clutch torque. The coefficient of friction is stored in characteristic diagrams in tabular form as a function of diverse influencing factors, that is, a clutch slippage, a current oil volumetric flow, and a current cooling oil temperature. In addition, the vehicle has an engine controller, which, in the driving mode, determines a current engine rotational speed (actual engine rotational speed) and a current associated engine torque (actual engine torque). By means of the engine control unit, in a stationary state of the vehicle with the internal combustion engine running, the actual engine rotational speed is adjusted to a predefined idling rotational speed.

The coefficient of friction of the clutch can be interpreted at an operating point (that is, for example, in a stationary state of the vehicle both with the internal combustion engine operating in the idling mode and with a slightly actuated clutch) as a proportionality factor between the resulting clutch torque and the set pressure. This coefficient of friction is identified on the part of the factory by a targeted analysis for a model system. The drawback of such a determination for the coefficient of friction is that the thus determined parameters are valid only within certain limits (production scatter) and also cannot reflect the changes in the respective coefficient of friction over the service life.

Such a change in the coefficient of friction can lead to losses in comfort during clutch operation. For this reason, it is preferred when the clutch torque characteristic curve or the coefficients of friction of the clutch stored in the clutch controller is or are adapted to the altered torque transmission behavior of the clutch.

By way of example, a method is known from DE 10 2004 029 558 A1 for adapting a relationship, which is stored in an electronic control device, between a torque that can be transmitted by a clutch and a control variable for controlling an actuation device of the clutch. Known from DE 2008 027 071 A1 is also a method and a device for adaptation of the coefficient of friction, in which a coefficient of friction of a clutch arranged between an electric machine and an internal combustion engine can be adapted. Known from DE 197 51 455 A1 is a method for regulating an automated clutch, with which an operationally safe and reliable clutch regulation is ensured. Known from DE 198 46 404 A1 is another method for determining the gradient of the coefficient of friction.

SUMMARY

The object of the invention consists in providing a vehicle and a method for operating a clutch that acts as a starter element, in which, in a simple and reliable way, the coefficient of friction stored in the clutch controller can be adapted to the actual torque transmission behavior of the clutch for determining the manipulated variable acting on the clutch actuator.

The object is achieved by the features of patent claim 1 or of patent claim 10. Preferred enhancements of the invention are disclosed in the dependent claims.

In accordance with the characterizing part of patent claim 1, the clutch controller is assigned an adaptation device, which, in the presence of a stationary state of the vehicle with the internal combustion engine running at the idling rotational speed, starts a coefficient-of-friction adaptation process. In the coefficient-of-friction adaptation process, the clutch controller generates a checking clutch torque. Accordingly, a checking manipulated variable, which correlates with the checking clutch torque, is applied to the clutch actuator. This leads to an increase in the actual engine torque to a checking engine torque and, in fact, while maintaining the actual engine rotational speed that is adjusted to the idling rotational speed. The checking engine torque, the checking manipulated variable acting on the clutch actuator, and the idling engine torque, which is produced in the stationary state of the vehicle with the clutch completely opened, are fed by signal technology to an analysis unit of the adaptation device. From these parameters, the analysis unit calculates an adapted coefficient of friction, which replaces the checking coefficient of friction (which, for example, is empirically determined) that is stored in the clutch controller. The checking manipulated variable is determined in the actuation unit as a function of the checking clutch torque generated in the clutch controller and a checking coefficient of friction correlating with the checking clutch torque.

In accordance with the invention, specific static and also dynamic driving situations, such as creeping, startup, etc., are analyzed. In this case, the coefficients of friction are calculated during the customer's driving operation from the setpoint pressure and the engine torque. They are then classified according to the different coefficient-of-friction dependencies, such as temperature, slippage, torque, etc., and processed based on statistical methods.

In the determination of the coefficient of friction in accordance with the invention, a static state is analyzed for the low-load range (that is, at low clutch torque). This relates to staying in a gear stage, that is, with an engaged clutch, at low torque, and with slippage of the idling rotational speed. The characteristic curve of the coefficient of friction is now interpolated from the dynamic low-load components, and, to a large extent, also through the statically determined point. At higher clutch torques, a static point is also determined, for example, before adjustment of the rotational speed. The further processing of the measured values corresponds in principle to that of the low load points.

With the invention, the behavior of the coefficient of friction over the entire life cycle of the vehicle or of the transmission is constantly updated. The updated coefficients of friction are used for the feed-forward control of the clutch. In this way, a self-adapting feed-forward control of the coefficient of friction occurs.

Further aspects of the invention will be explained below:

Thus, in a way that is known in and of itself, the coefficient of friction describes the amplification between a contact pressure (that is, the normal force) acting on the clutch and the thereby resulting clutch torque until a torque can be transmitted without slippage. In a known way, the clutch torque is directly proportional to the product of the coefficient of friction and the contact pressure. From this relationship, the manipulated variable acting on the clutch actuator in the above-mentioned actuation unit is calculated by using the following equation:

$$M_{K,soll} = \mu \times K_{geo} \times \Delta p, \text{ where}$$

$M_{K,soll}$ setpoint clutch torque
$\mu$ coefficient of friction
$K_{geo}$ constant
$\Delta p$ differential pressure at the grab point.

In the already mentioned analysis unit of the adaptation device, the adapted coefficient of friction $\mu_a$ is calculated in the adaptation operation from the following equation:

$$\mu_a = \frac{\Delta M}{\Delta p_{prüf} \times K_{geo}},$$

where $\Delta M$ torque difference between the checking engine torque $M_{M,prüf}$ and the idling engine torque $M_{Leerlauf}$
$\Delta p_{prüf}$ checking manipulated variable, correlated with the checking clutch torque $M_{K,prüf}$,
$K_{geo}$ constant.

The torque difference $\Delta M$ between the checking engine torque $M_{M,prüf}$ and the idling engine torque $M_{Leerlauf}$ corresponds to an actual clutch torque that can be transmitted by the clutch. In the adaptation operation, the actual clutch torque at the internal combustion engine is largely identical to the checking clutch torque output by the controller.

As already mentioned above, the calculation of the manipulated variable (that is, the differential pressure acting on the clutch actuator at the grab point) is carried out on the basis of a coefficient of friction that is stored in the clutch controller. The checking coefficient of friction $\mu_{prüf}$ forms, together with a plurality of other coefficients of friction, at least one start characteristic diagram stored in tabular form, which can be spanned over a multi-axis characteristic diagram. In the start characteristic diagram, the coefficients of friction are entered as a function of a clutch slippage and a clutch torque. Especially in the case of a wet-running multi-disc clutch through which cooling oil flows, a plurality of such characteristic diagrams are stored as a function of different cooling oil temperatures and/or volumetric flows.

In the adaptation operation, the adapted coefficient of friction $\mu_A$ calculated in the analysis unit replaces the checking coefficient of friction $\mu_{prüf}$ in the start characteristic diagram. In contrast, the remaining checking coefficients of friction in the start characteristic diagram are not calculated also in computational-time-intensive signal processing, but rather, in particular, they are adjusted to the by calculated adapted coefficient of friction $\mu_a$ by interpolation and, in fact, are adapted with the formation of an adapted characteristic diagram. In accordance with the invention, therefore, the adapted characteristic diagram is determined solely on the basis of the calculated adapted coefficient of friction $\mu_a$. By way of example, the adapted characteristic diagram can be formed with a parallel shift of the start characteristic diagram along a coefficient-of-friction axis in the characteristic diagram to the calculated adapted coefficient of friction $\mu_a$.

In addition, when a wet-running multi-disc clutch is used, the current cooling oil temperature and the current cooling oil volumetric flow are recorded in each adaptation operation. Accordingly, the calculated adapted coefficient of friction is entered as a function of the oil temperature/oil volumetric flow in a characteristic diagram stored in the clutch controller and replaces therein the corresponding checking coefficient of friction $\mu_{prüf}$ for the corresponding oil temperature/oil volumetric flow.

The advantageous embodiments and enhancements explained above and/or presented in the dependent claims—except for, for example, in cases of clear dependencies or incompatible alternatives—can be applied individually or also, however, in any desired combination with one another.

BRIEF DESCRIPTION OF THE DRAWINGS

The invention and its advantageous embodiments and enhancements as well as the advantages thereof will be explained in detail below on the basis of drawings.

Shown are.

DETAILED DESCRIPTION

Figure 1:
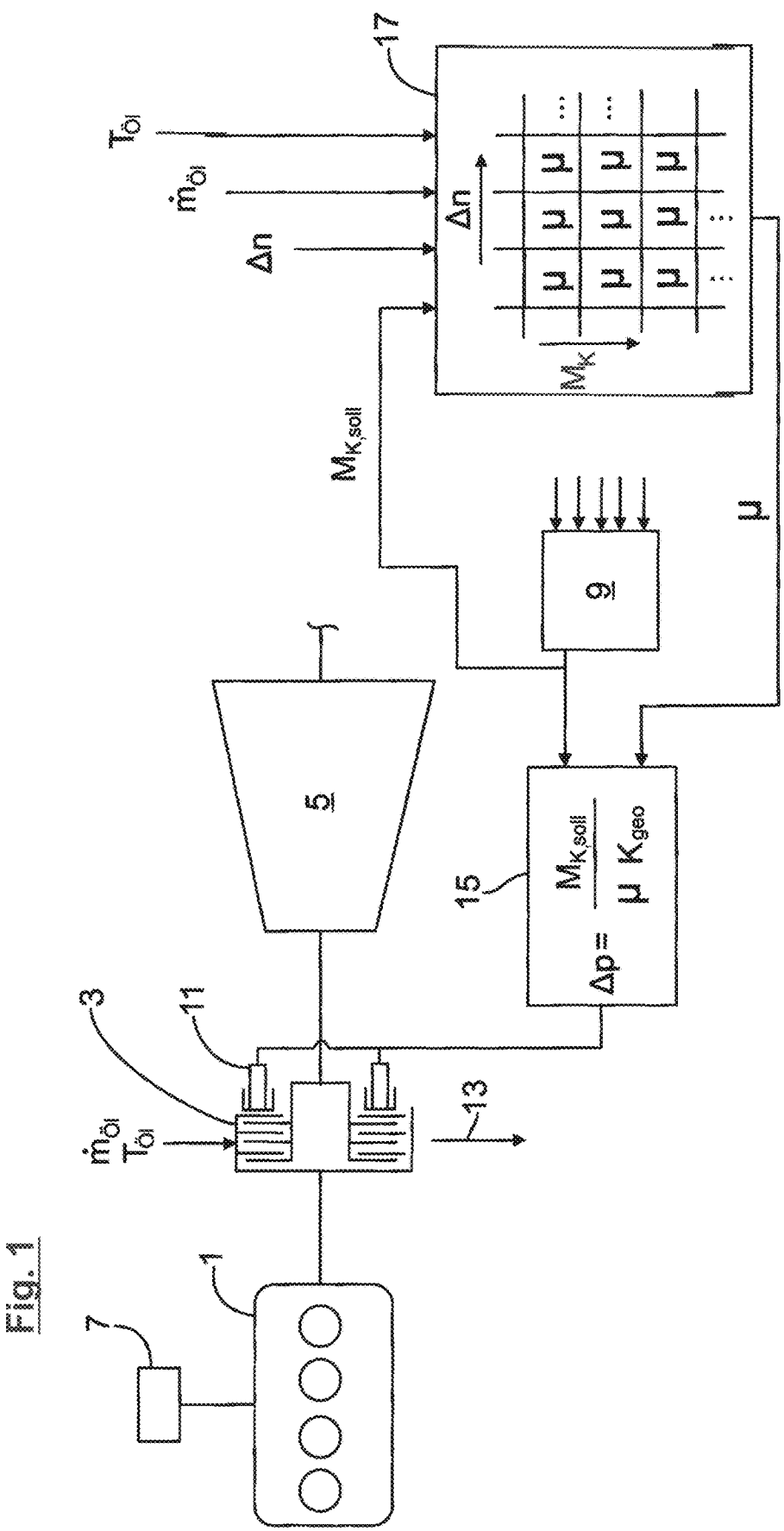
FIG. 1 in a highly simplified block diagram, the drivetrain with assigned clutch controller for automatic actuation of a wet-running multi-disc clutch as a starter element.
Figure 3:
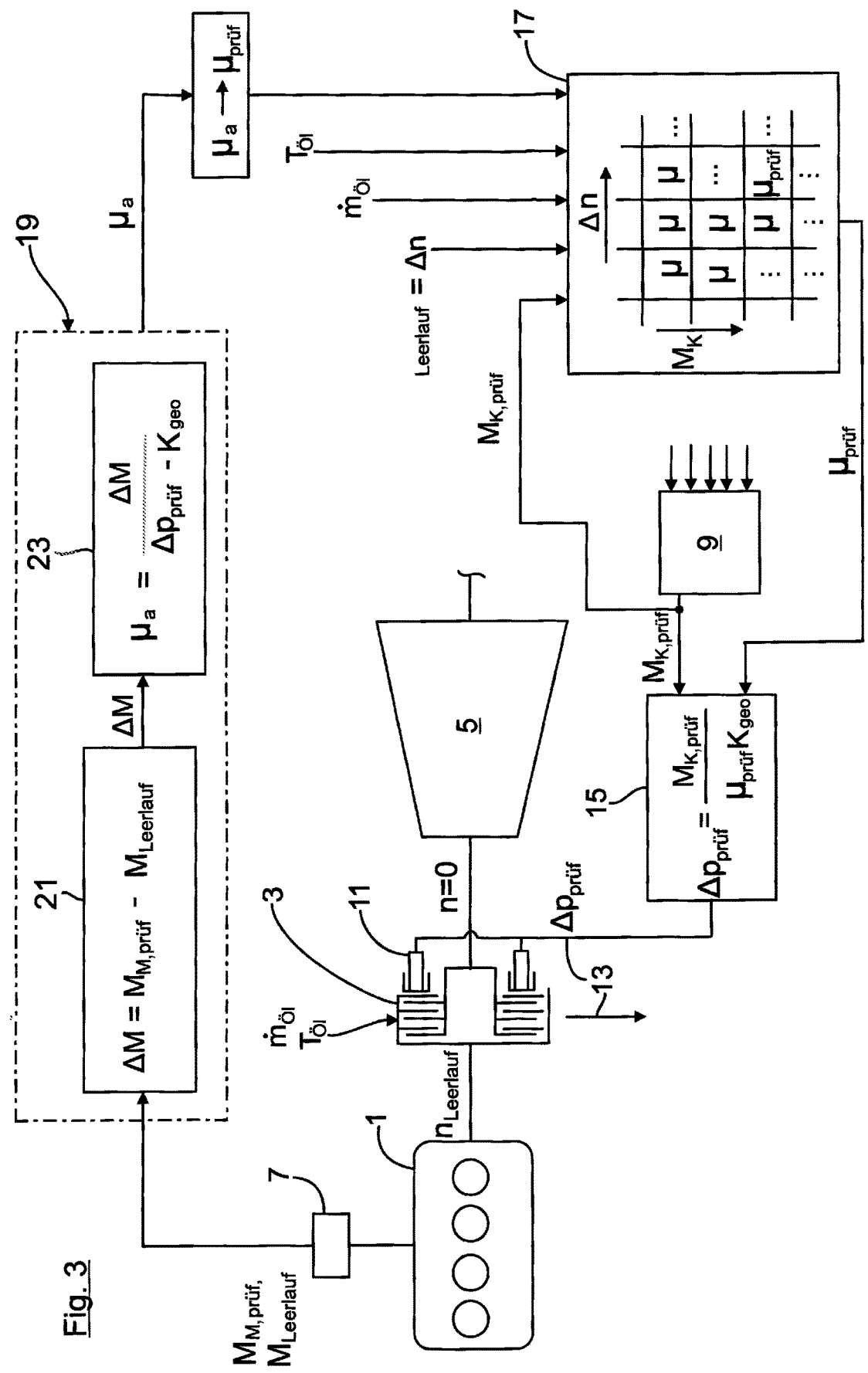
FIG. 3 a view corresponding to FIG. 1 with an additional adaptation device.

Shown in the FIG. 1, in a highly simplified way, is a drivetrain of a motor vehicle, in which an internal combustion engine 1 can be driven, with intermediate connection of a starter element 3 to a vehicle transmission 5. The internal combustion engine 1 can be actuated via an engine controller 7, which, in the driving mode, determines an actual engine rotational speed as well as an actual engine torque, and, in a stationary state of the vehicle, regulates the actual engine rotational speed to a predefined idling rotational speed $n_{Leerlauf}$ (FIG. 3). In FIG. 1, the starter element 3 is a wet-running multi-disc clutch, which can be actuated electrohydraulically via a clutch controller 9. For this purpose, the multi-disc clutch 3 has a ring piston as a clutch actuator 11, which is in signal connection with the clutch controller 9 via a hydraulic system 13 and an actuation unit 15.

In driving mode, as a function of current driving operation parameters, the clutch controller 9 calculates a setpoint clutch torque $M_{K,soll}$, which, in the actuation unit 15, is converted to a set pressure $\Delta p$ correlating therewith. The set pressure $\Delta p$ acts on the clutch actuator 11 in order to adjust an actual clutch torque $M_{K,ist}$, which matches the setpoint clutch torque $M_{K,soll}$ that was calculated using the clutch controller 9, in the multi-disc clutch 3.

The manipulated variable $\Delta p$ is determined in the actuation unit 15 as a function of the setpoint clutch torque $M_{K,soll}$ and as a function of a coefficient of friction µ stored in the clutch controller 9 and, in fact, is determined by means of the following equation:

$$\Delta p = \frac{M_{K,soll}}{\mu \times K_{geo}},$$

where
$M_{K,soll}$ setpoint clutch torque
µ coefficient of friction
$K_{geo}$ constant.

Figure 2:
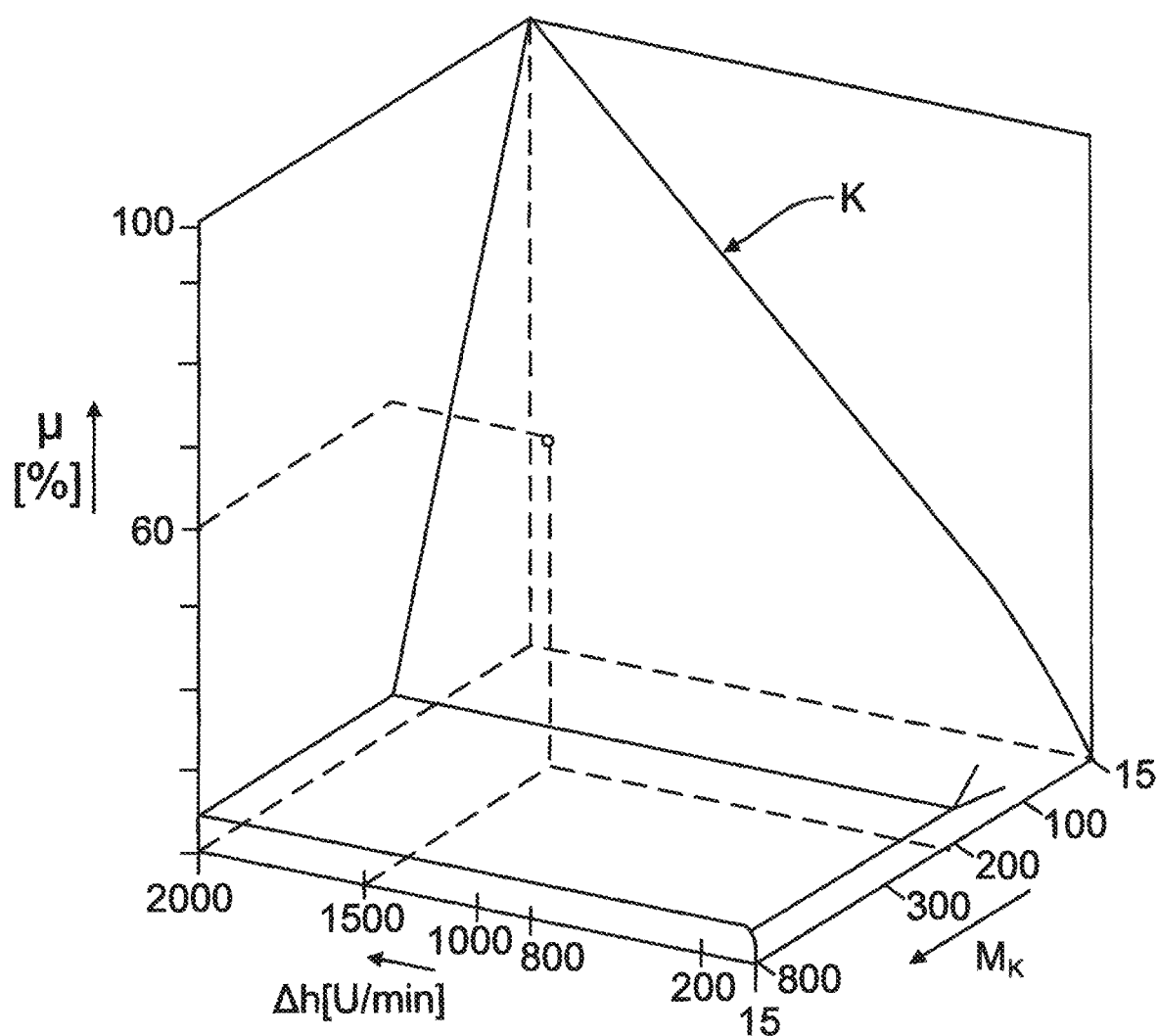
FIG. 2 a characteristic diagram, from which a coefficient of friction can be read as a function of the clutch slippage and the clutch torque, in order to calculate the manipulated variable acting on the clutch actuator.

In FIG. 1, the actuation unit 15 is in signal connection with a database 17. Stored in the database 17 diagrams are coefficients of friction µ, in a plurality of coefficient-of-friction characteristic, only one of which is shown in FIG. 1. By way of example, in FIG. 2, such a coefficient-of-friction characteristic diagram K is spanned in a multi-axis characteristic field diagram as a closed envelope surface. In the characteristic diagram of FIG. 2, it is possible to determine respectively assigned coefficients of friction µ, as a function of a clutch slippage Δn and a clutch torque $M_K$. The coefficient-of-friction characteristic diagram shown in FIG. 2 is applicable for a predefined cooling oil temperature as well as a predefined cooling oil volumetric flow m. In the database 17, a plurality of such coefficient-of-friction characteristic diagrams are stored as a function of different cooling oil temperatures $T_{öl}$ and cooling oil volumetric flows.

The characteristic diagram K illustrated in FIG. 2 was set at the factory and is based, for example, on empirical determination. By way of example, in the database 17 for a clutch slippage Δn of 1500 rpm and for a setpoint clutch torque of 200 Nm in FIG. 2, a coefficient of friction µ that lies at about 60% is determined. This coefficient of friction µ is read out in FIG. 1 in the actuation unit 15 in order to compute the manipulated variable Δp correlating with the setpoint clutch torque $M_{K,soll}$.

Figure 4:
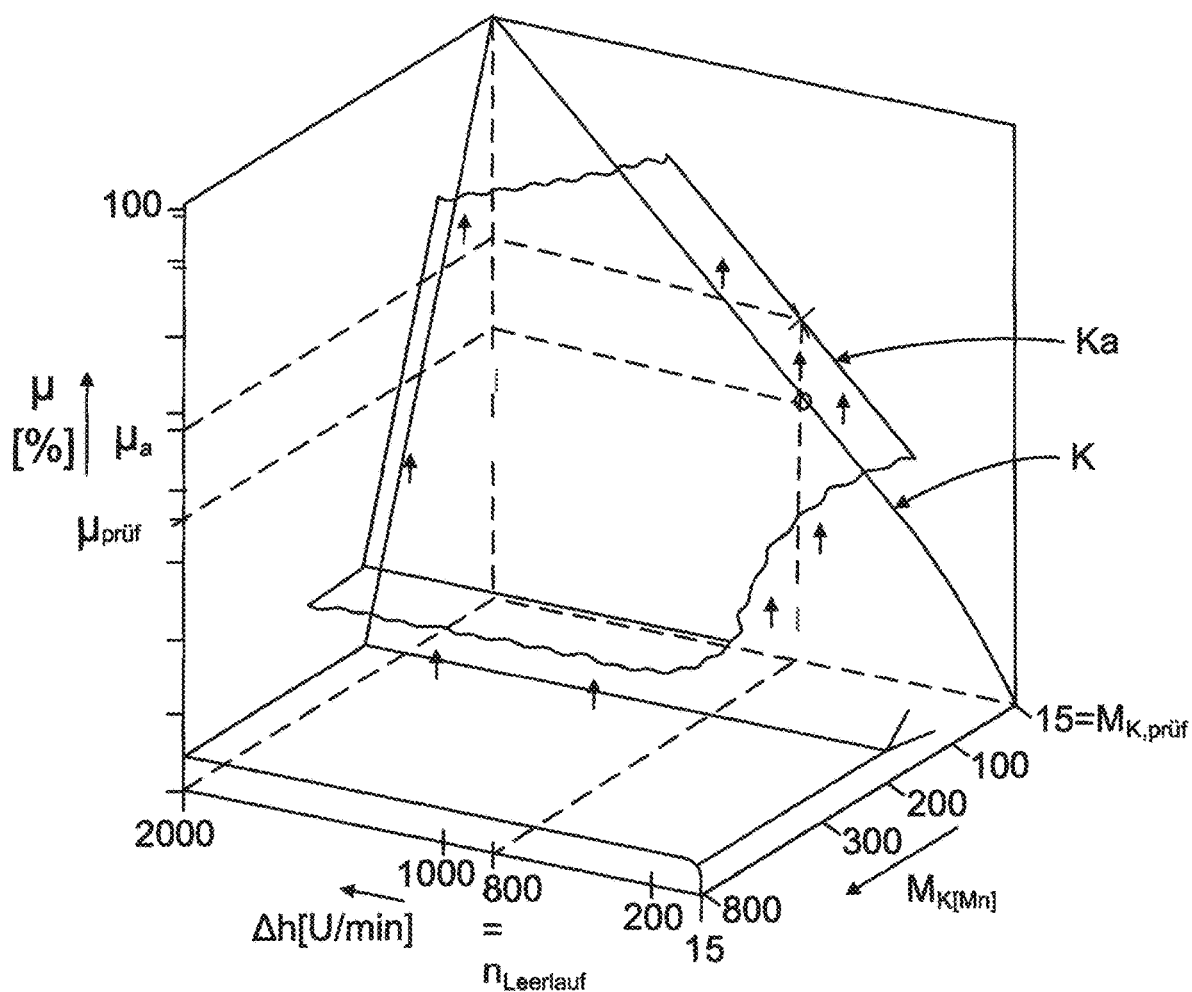
FIG. 4 a view corresponding to FIG. 3 for illustration of the adaptation operation.

Described below, on the basis of FIGS. 3 and 4, is an adaptation operation, with which the characteristic diagram K shown in FIG. 2 can be adapted to a current torque transmission behavior of the multi-disc clutch 3: For carrying out the adaptation operation, an adaptation device 19 is assigned to the clutch controller 9 in FIG. 3. Said adaptation device starts the coefficient-of-friction adaptation operation in the presence of a stationary state of the vehicle with the internal combustion engine 1 operating in the idling mode. Generated in the clutch controller 9 in the coefficient-of-friction adaptation process is a checking clutch torque $M_{K,prüf}$ (that is, in FIG. 4, a creep torque of 15 Nm). In the characteristic diagram of FIG. 4, as a function of the checking clutch torque $M_{K,prüf}$ and the current slippage Δn (that is, the idling rotational speed), a checking coefficient of friction $\mu_{prüf}$ is determined and read out at the actuation unit 15. The manipulated variable 15 calculates from it a checking manipulated variable $\Delta p_{prüf}$ with which the clutch actuator 11 is actuated.

Based on the actuation of the clutch actuator 11 with the checking manipulated variable $\Delta p_{prüf}$ there occurs in FIG. 3 an increase in the actual engine torque to a checking engine torque $M_{M,prüf}$ while maintaining, however, the actual engine rotational speed that is regulated to the idling rotational speed $n_{Leerlauf}$*. In a subtraction element 21 of the adaptation device 19, a torque difference ΔM, which is obtained in a stationary state of the vehicle with a completely opened or disengaged multi-disc clutch 3, is determined from the checking engine torque $M_{M,prüf}$* and the idling engine torque $M_{Leerlauf}$.

The torque difference ΔM determined in the subtraction element 21 corresponds to an actual clutch torque of the multi-disc clutch 3 that is set by actuation with the checking manipulated variable $\Delta p_{prüf}$ and matches the setpoint clutch torque $M_{K,soll}$. By means of the torque difference ΔM, an adapted coefficient of friction $\mu_a$ is calculated in an analysis unit 23 and, in fact, is calculated by means of the following equation:

$$\mu_a = \frac{\Delta M}{\Delta p_{prüf} \times K_{geo}},$$

where
ΔM torque difference between the checking engine torque $M_{M,prüf}$ and the idling engine torque $M_{Leerlauf}$;
$\Delta p_{prüf}$ checking manipulated variable, which correlates with the checking clutch torque $M_{K,prüf}$.

The adapted coefficient of friction $\mu_a$ calculated in the analysis unit 23 is transmitted to the database 17 and is stored there in the database 17 instead of the checking coefficient of friction $\mu_{Prüf}$.

The adaptation operation illustrated above is carried out automatically in the driving mode, provided that a detection unit of the adaptation device 19 records a stationary state of the vehicle, in which the internal combustion engine 1 is operated in the idling mode, such as, for example, in a stationary state of the vehicle at a traffic light, for which, in the stationary state of the vehicle, a creep torque is applied to the multi-disc clutch 3, in order to make possible an instantaneous startup after the release of the vehicle brake, with the creep torque corresponding to the checking setpoint torque $M_{K,prüf}$ used in the adaptation operation.

As can be seen from FIG. 3, the adapted coefficient of friction $\mu_a$ calculated in the adaptation operation in the analysis unit 23 replaces the checking coefficient of friction $\mu_{prüf}$ corresponding to it in the start characteristic diagram K (FIG. 4). The remaining coefficients of friction in the start characteristic diagram K are adjusted, in particular by interpolation, to the calculated adapted coefficient of friction $\mu_a$, as a result of which an adapted characteristic diagram $K_a$ (partially indicated in FIG. 4) is obtained. In a variant with a reduced computational time, the adapted characteristic diagram $K_a$ can be shifted with a parallel shift of the start characteristic diagram K along a coefficient-of-friction axis in the characteristic diagram to the calculated adapted coefficient of friction $\mu_a$, as it is indicated in FIG. 4.

The invention claimed is:
1. A vehicle, comprising:
a drivetrain of which a clutch, in particular a wet-running multi-disc clutch, is connected as a starter element between an internal combustion engine and a transmission, having a clutch controller, which, as a function of current driving operation parameters, determines a setpoint clutch torque and actuates a clutch actuator with a manipulated variable correlating with the setpoint clutch torque, in order to set at the clutch an actual clutch torque, which manipulated variable is determined as a function of the setpoint clutch torque and a coefficient of friction stored in the clutch controller in an actuation unit of the clutch controller, and having an engine controller, which determines an actual engine rotational speed and an actual engine torque, and, in a stationary state of the vehicle with the internal com- bustion engine running, regulates the actual engine rotational speed to a predefined idling rotational speed, wherein an adaptation device is assigned to the clutch controller, and, in the presence of a stationary state of the vehicle with the internal combustion engine operating in the idling mode, starts a coefficient-of-friction adaptation operation, in which, as a function of a checking clutch torque and a checking coefficient of friction, a checking manipulated variable is applied to the clutch actuator, and, in fact, is applied with an increase in the actual engine torque to a checking engine torque, while maintaining the actual engine rotational speed that is regulated to the idling rotational speed, and wherein the adaptation device has an analysis unit, which, from the checking engine torque, from the checking manipulated variable, and from the idling engine torque that is produced in the stationary state of the vehicle with a completely opened or disengaged clutch, calculates an adapted coefficient of friction, which can be stored in the clutch controller instead of the checking coefficient of friction.

2. The vehicle according to claim 1, wherein the manipulated variable acting on the clutch actuator is calculated from the following equation:

$$\Delta p = \frac{M_{K,soll}}{\mu \times K_{geo}},$$

where $M_{K,soll}$ : setpoint clutch torque
$\mu$ : coefficient of friction
$K_{geo}$ : constant.

3. The vehicle according to claim 1, wherein, in the coefficient-of-friction adaptation operation, a torque difference between the checking engine torque and the idling engine torque corresponds to an actual clutch torque applied to the clutch, which correlates with the checking clutch torque output by the clutch controller.

4. The vehicle according to claim 3, wherein, in the analysis unit of the adaptation device, the adapted coefficient of friction is calculated from the following equation:

$$\mu_a = \frac{\Delta M}{\Delta p_{prüf} \times K_{geo}},$$

where $\Delta M$ : torque difference between checking engine torque $M_{M,prüf}$ and idling engine torque $M_{Leerlauf}$ $\Delta p_{prüf}$ : checking manipulated variable, correlated with checking clutch torque $M_{K,prüf}$.

$K_{geo}$ : constant.

5. The vehicle according to claim 1, wherein the coefficient-of- friction adaptation operation is carried out automatically in a driving mode, provided that a detection unit of the adaptation device records a stationary state of the vehicle with the internal combustion engine operating in the idling mode.

6. The vehicle according to claim 1, wherein, in the coefficient-of- friction adaptation operation, the checking coefficient of friction read out in the actuation unit, together with a plurality of other checking coefficients of friction, forms at least one start characteristic diagram stored in tabular form, which can be spanned in a multi-axis characteristic diagram, and in which the coefficients of friction are stored, in particular empirically, as a function of a clutch slippage and a clutch torque, and, in particular, a plurality of such characteristic diagrams are stored as a function of different cooling oil temperatures and/or volumetric flows.

7. The vehicle according to claim 6, wherein, in the adaptation operation, the adapted coefficient of friction calculated in the analysis unit replaces the checking coefficient of friction corresponding thereto in the start characteristic diagram, and the remaining coefficients of friction in the start characteristic diagram can be adjusted to the adapted coefficient of friction, in particular by interpolation or by estimation, and, can be adjusted with the formation of an adapted characteristic diagram.

8. The vehicle according to claim 7, wherein the adapted characteristic diagram is formed with a parallel shift of the start characteristic diagram along a coefficient of friction axis to the adapted coefficient of friction in the characteristic diagram.

9. The vehicle according to claim 6, wherein, in addition, in each adaptation operation, a current oil temperature and a current oil volumetric flow are recorded, and, as a function of thereof, in one of the plurality of such characteristic diagrams, which are stored in the clutch controller, the adapted coefficient of friction replaces the corresponding checking coefficient of friction.

10. The vehicle according to claim 5, wherein the coefficient-of-friction adaptation operation is carried out automatically in the stationary state of the vehicle, for which a creep torque is applied to the clutch, in order to make possible an instantaneous startup after the release of a vehicle brake, wherein the creep torque corresponds to the checking setpoint torque used in the coefficient-of-friction adaptation operation.

* * * * *